United States Patent [19]

Emken et al.

[11] 4,305,882

[45] Dec. 15, 1981

[54] PARTIAL ARGENTATION RESIN CHROMATOGRAPHY FOR SEPARATION OF POLYUNSATURATED FATTY ESTERS

[75] Inventors: Edward A. Emken, Princeville; Richard O. Adlof; Henry Rakoff, both of Peoria, all of Ill.

[73] Assignee: The United States of America as represented by the Secretary of Agriculture, Washington, D.C.

[21] Appl. No.: 132,584

[22] Filed: Mar. 21, 1980

[51] Int. Cl.³ .......................... C09F 5/10; C11B 3/00
[52] U.S. Cl. ................................ 260/428.5; 260/409; 260/419
[58] Field of Search ............... 260/428.5, 419, 409

[56] References Cited

U.S. PATENT DOCUMENTS 4,189,442  2/1980  Lubsen et al. .................. 260/428.5

*Primary Examiner*—John F. Niebling
*Attorney, Agent, or Firm*—M. Howard Silverstein; David G. McConnell; Curtis P. Ribando

[57] ABSTRACT

Mixtures containing polyunsaturated fatty esters are fractionated by partial argentation resin chromatography, in which the mixture is eluted through a column packed with a partially silvered sulfonic acid ion exchange resin.

7 Claims, No Drawings

PARTIAL ARGENTATION RESIN CHROMATOGRAPHY FOR SEPARATION OF POLYUNSATURATED FATTY ESTERS

BACKGROUND OF THE INVENTION

1. Field of the Invention

The separation of natural oils and other oleaginous mixtures into high purity fractions of their fatty acid constituents is frequently required for investigative and commercial purposes. While the structural diversity of the fatty acids from a given natural triglyceride is somewhat limited, the problem of cleanly separating the acids from one another is often difficult. Moreover, catalytic hydrogenation as practiced in the production of much of our edible oils creates a complex array of positional and geometric isomers, thereby further increasing the difficulty of fractionation. To facilitate handling and to inhibit undesired reactions, the fatty compounds of such oleaginous mixtures are conventionally separated as one of their monobasic, lower alkyl esters. These are prepared by esterification of the free fatty acids or by direct transesterification of the triglycerides. Moreover, it is often the esterified form which is desired as the end product. While there are a variety of fractionating techniques available, most are either limited to a few special types of mixtures or are applicable only to separations on an analytical scale. This invention relates to a versatile method and means for separating substantial quantities of a large variety of fatty ester mixtures into pure fractions.

2. Description of the Prior Art

The use of argentation column chromatography for fractionating fatty esters was first reported by Wurster et al. [JAOCS 40: 513–514 (1963)]. A silver-saturated cation exchange resin was used to separate a mixture of methyl oleate, methyl linoleate, and methyl linolenate by eluting each with a different solvent. The plural solvent system was not only complicated but also precluded solvent recirculation, thereby rendering it commercially impractical. Later, Emken et al. [JAOCS 41: 388–390 (1964)] used a silver-saturated macroreticular cation exchange resin and a single-solvent eluant to obtain relatively pure fractions of both saturated and cis and trans monounsaturated compounds from an esterified and slightly modified olive oil. Some success was also shown for the separation of certain positional isomers of the diunsaturated esters. However, the nonconjugated cis,cis dienes and the cis,cis,cis triene were not eluted. Emken et al. [JAOCS 44(7): 373–375 (1967)] demonstrated that the same argentation technique could be applied to separate conjugated methyl octadecadienoates into cis,cis-, cis,trans-, and trans,trans-isomers. Subsequently, it was taught by Scholfield et al. [JAOCS 54(8): 319–321 (1977)] that with resins having a greater surface area, nonconjugated methyl octadecadienoate can be recovered from an argentated column, but only after extensive elution. Similarly, Emken et al. [JAOCS 55(7): 561–563 (1978)] teaches that with a high surface area resin, mixtures containing saturates, as well as mono-, di-, and triunsaturates, can be readily resolved, and even positional isomers of octadecadienoate can be partially resolved. However, the triunsaturates are not recovered from the column with the eluant and a large volume of solvent is required to elute the diunsaturates. Certain mono- and dihydroxy monoenoic esters have also been separated by silver-saturated resin chromatography [Rakoff et al., JAOCS 55(7): 564–566 (1978)].

SUMMARY OF THE INVENTION

We have now unexpectedly discovered that polyunsaturated fatty esters which were known to elute from a silvered resin column very slowly, or not at all, can be readily fractionated and recovered from an ester mixture with a single solvent by partial argentation resin chromatography (PARC). This novel technique uses a column packed with macroreticular sulfonic acid ion exchange resin which has been only partially silvered to the extent of 17–91% of the theoretical amount.

In accordance with this discovery, it is an object of the invention to expand the use of argentation resin chromatography to polyunsaturate-containing lipid mixtures which heretofore could not be fractionated on silvered columns.

It is also an object of the invention to more quickly and efficiently elute from silvered resins polyunsaturated fatty esters which were difficult or impossible to recover from conventional argentation columns.

A further object of the invention is to employ PARC as a means to purify fatty ester compounds.

Another object of the invention is to devise a separatory column or a system of columns which can be readily tailored to separate specific fatty ester mixtures without requiring solvent changes.

Other objects and advantages of the invention will become readily apparent from the ensuing description.

DETAILED DESCRIPTION OF THE INVENTION

The PARC method contemplated by this invention is similar to that employed by Emken et al. (JAOCS 1964), supra, in that a column is packed with an ion exchange resin which has been treated with silver ion, and the sample to be fractionated is eluted through the column with a solvent. The silver ion forms complexes with the olefinic double bonds of the sample. Compounds differing in number, position, and geometric configuration of olefinic bonds are differentially complexed to the silver ions on the resin, and are therefore eluted through the column at different rates.

The resins for use herein are sulfonated, crosslinked, polystyrene resins, otherwise known as sulfonic acid macroreticular cation exchange resins. They are characterized by a high surface area and high porosity, and typically have a sodium cation exchange capacity of about 3 meq./g. and a silver cation exchange capacity of 3.6–3.7 meq./g. The wet particle size of these resins are preferably in the range of about 40–400 mesh. Though for a particular column, the particle size should be within narrower limits depending on its prospective use. For example, a 200–400 mesh resin would be preferred in fractionating several components from a mixture or in cleanly separating two closely elutable compounds. A 40–60 mesh resin permits more rapid elution and is effective for mixtures of fairly dissimilar esters. We have found that columns packed with 40/80, 80/100, or 100/120 mesh resin produce high flow rates at low solvent pressure, good column capacities, minimal channeling, and adequate separation capabilities for preparative work.

The compounds which are advantageously separated by this invention are the higher polyunsaturated monobasic fatty acid esters. Included in this group are monobasic esters of those straight-chain fatty acids having at least 10 carbon atoms and two or more olefinic bonds. Of particular interest are the esters of polyunsaturated acids derived from natural fats and oils and having an even number of carbon atoms in the chain. These are usually dienoic, trienoic, or tetraenoic. Linoleic, linolenic, and arachidonic acids are commercially the most important members of this group. Also of interest are the geometric isomers produced by catalytic hydrogenation of the esterified natural acids. The most marked improvement in fractionability is of course observed with the nonconjugated dienes and with the more highly unsaturated esters. It is also envisioned that the invention would be operable for certain derivatives of these compounds, provided that the derivatizing functionality is not irreversibly reactive with the silver ion to the extent of inactivating it.

The above-mentioned polyunsaturated esters may be fractionated by the inventive procedure from practically any mixture comprising at least one other monobasic fatty ester. These other esters in the mixture may be saturated, monoenoic, or polyunsaturated. The unsaturated esters may in fact be positional or geometric isomers of the first ester. Exemplary of such mixtures are transesterified natural oils, such as the methyl esters of soybean oil, linseed oil, cottonseed oil, safflower oil, peanut oil, and the like. Generally, the transesterified ester of any mixed triglyceride or the catalytic hydrogenation product of such an ester would be beneficially fractionated by the instant process.

The proper degree of resin argentation for PARC is dependent upon the mixture to be separated, but in any case must be in the range of 17–91%. That is, 17–91% of the silver-displaceable protons in the sulfonic acid resin are displaced. This corresponds to a silver equivalency of 0.6–3.4 meq. Ag$^+$/g. of resin. As a rule of thumb, the greater the number of sites of unsaturation and the greater the number of carbon atoms between them, the less silver ion the resin should contain. As the concentration of silver ion decreases, the elution time for a given compound also decreases. However, the overall capacity of the column and its ability to cleanly separate saturates, monoenes, and conjugated dienes improves at higher degrees of argentation. For example, a 17–40% silvered resin will readily permit recovery of a trienoic or tetraenoic fatty ester, whereas a mixture of nonconjugated diene, conjugated diene, monoenes, and saturates is best separated using a resin silvered in the range of about 41–91%. Below 17%, the capacity of the column falls below an effective level, and over 91%, there is no noticeable advantage over the completely argenated columns of the prior art.

The partially argentated resins of this invention are most readily prepared by a batch process in which the predetermined equivalents of silver ion are added to an aqueous slurry of the resin and stirring is continued until equilibrium. Silver nitrate is the preferred ion source and the Ag$^+$ incorporation is described by the equation:

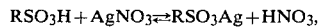

$$RSO_3H + AgNO_3 \rightleftharpoons RSO_3Ag + HNO_3,$$

where R=resin.

The amount of silver actually incorporated on the resin is then determined by titration of the HNO$_3$. The maximum percent silver which can be incorporated by a single AgNO$_3$ batch treatment is approximately 85% of the theoretical amount. However, for more than about 75% silver ion exchange in a single batch, the required excess of AgNO$_3$ becomes disproportionate to the additional silver incorporated. For silvering in excess of that amount, it is therefore preferred to employ two successive batch treatments. When the theoretical amount of AgNO$_3$ (equivalent to the number of meq. sulfonic acid on the originally unsilvered resin) is used in each treatment, the same percentage of silver ion (based on the unsilvered portion) is incorporated each time.

Methanol is the preferred eluant solvent for use in fractionating the methyl esters in accordance with the invention. Of course, if the fatty compounds are in the form of their ethyl esters, the use of ethanol as the solvent would eliminate transesterification in the column.

The amount of solvent required to elute a particular fatty ester will of course depend on the size of the column, the percent argentation, and the number, position, and geometry of the sites of unsaturation. The amount of solvent needed to obtain the peak elution of a particular compound is referred to as the "elution volume" or "retention volume". And accordingly the "elution time" or "retention time" represents the duration between initial solvent addition and the peak elution of the compound. The retention time is a function of both the elution volume and the flow rate. For 0.6×74 cm. preparatory columns, we have found flow rates in the range of about 0.2 to about 1.5 ml./min. to be satisfactory for the separation of most polyunsaturated fatty esters. At resin mesh sizes between about 40 and 170, the above flow rates can be maintained at low pump pressures on the order of about 1–25 p.s.i.g.

The partial argentation method of this invention minimizes sample tailing and reduces elution volumes and times, while maintaining an acceptable degree of resolution. In fact, complete separation resulting in 99+% purity can be achieved for many compounds in the above-described mixtures. Moreover, the applicability of the PARC technique to relatively large samples and to a diverse variety of fatty ester mixtures renders it useful for both preparative and commercial fractionation.

The theory of operation of the PARC technique is not completely understood. It would be expected from existing theory and from other fractionating techniques employing silver nitrate that the percent silver ion on the resin would not have any influence on the elution of a polyunsaturated fatty ester. Regardless of the silver ion concentration, it would be expected that a nonconjugated diene would require approximately twice the elution time of a monoene having the same chain length. While this behavior is observed for thin-layer chromatography in which silica gel is treated with silver nitrate, it does not hold for silver resin column chromatography. It was therefore surprising to discover that reduction of the silver ion concentration on macroreticular resins would reduce elution times of dienes by several fold, and permit recovery of the more highly unsaturated fatty esters which previously could not be eluted under conditions which also permitted elution of monounsaturated fatty esters.

EXAMPLE 1

A. Preparation of Resin

A sulfonated, crosslinked, polystyrene-type resin ("Amberlyst XN1010") in the hydrogen form and having a mesh size of 16/50, a bulk density of 545 kg./m.$^3$, a surface area of 500 sq. m./g., a mean pore diameter of 50 Å, and a cation (Na$^+$) exchange capacity of 3.1 meq./g. was ground in a Model 900 Burr mill set at an opening of 1.5 mm. (0.06 in.). The ground resin was soaked in methanol for 1 hr. whereby it generated heat and swelled approximately 30% by volume. After recovery by decantation, it was suspended in methanol five more times, with the solvent being rapidly decanted each time to remove the super fines. The methanol-treated resin was then washed with water resulting in approximately 10% swelling by volume, and the addition/decantation process was repeated with water five times. The resin was allowed to settle for 15 min. after each wash and then stored overnight under the final water wash. The wet resin was classified on USA Standard Sieves, and mesh sizes 40/80, 80/100, and 100/120 were collected for subsequent use. They had a silver ion exchange capacity ranging from 3.6–3.7 meq./g., determined by titrating the $HNO_3$ eluants from the preparation of silver-saturated columns as described below. Since these resins were prepared wet, the conversion factors for milliliters to grams were determined for each mesh size. These factors were determined gravimetrically from a resin sample which settled overnight in a graduated cylinder.

B. Preparation of Control Column

Control columns with 100% silver-saturated resin were prepared by repeatedly passing a 0.2 M aqueous solution of silver nitrate ($AgNO_3$) through a column containing the wet resin until the eluant was no longer acidic. After equilibrating for 1 hr., the excess $AgNO_3$ and $HNO_3$ were removed by washing with distilled water. Gradually increasing amount of $CH_3OH$ in water (i.e., 25%, 50%, 75%, 100%) were then passed through the column.

C. Preparation of PARC Columns

The PARC test columns were prepared by a batch process. Approximately 25 ml. of the wet resin was transferred with 200 ml. of water to a 3-necked, 500-ml. round bottomed flask equipped with an addition funnel and mechanical stirrer. The calculated amount of $AgNO_3$ (based on meq. sulfonic acid/g. resin) in 200 ml. of water was added dropwise over a 20-min. period. The slurry was stirred for 1 hr. and the resin separated by vacuum filtration. After washing with water, the resin was transferred directly into $CH_3OH$ and slurry packed into the column. The actual amount of silver ion incorporated into the resin was determined by precipitating the residual $AgNO_3$ from the wash water with NaCl and titrating the $HNO_3$ with sodium hydroxide to a phenolphthalein endpoint. Partially argentated resins containing 17%, 36%, 54%, 61%, and 72% silver ion were prepared by this process. A 91% silvered resin was prepared by a two-batch process. In the first treatment, the theoretical amount of $AgNO_3$ needed to exchange 100% of the sulfonic acid protons resulted in a resin containing 70% of the theoretical amount of silver ion. In the second treatment, again adding the original theoretical amount of $AgNO_3$ resulted in displacement of another 70% of the remaining acidic protons. Since the protons remaining after the first treatment constituted 30% of the total, the second treatment displaced an additional 21% (70%×30%) of the original protons.

EXAMPLES 2–5

Glass chromatography columns (0.6×85 cm.) packed with approximately 20 ml. of either saturated argentated resin (control) prepared by the method of Example 1B or partially argentated resins prepared by the method of Example 1C were used to determine elution volumes for standard samples of methyl linoleate. One hundred-milligram samples were eluted through the column with methanol metered by a liquid chromatography pump at a flow rate of 0.7 ml./min. The effluent was monitored by a refractometer, and fractions were analyzed with a gas chromatograph (GC) equipped with a flame ionization detector. The results are reported in the Table below.

EXAMPLES 6–7

The procedure of Examples 2–5 was repeated with a methyl ester mixture of stearate, oleate, and linoleate. A 100% argentated unground resin (control) and methanol solvent flow rate of 0.27 ml./min. were employed for Example 6. The ground resin for Example 7 was 54% argentated and the solvent flow rate was 0.55 ml./min. The results are reported in the Table.

EXAMPLES 8–9

The procedure of Examples 2–5 was repeated with a methyl ester mixture of saturates, oleate, linoleate, linolenate, and arachidonate. For Example 8, the resin was 36% argentated and the methanol flow rate was 0.4 ml./min. For Example 9, the resin was 17% argentated and the methanol flow rate was 0.19 ml./min. The results are shown in the Table.

EXAMPLE 10

A glass chromatography column (5×53 cm.) packed with 700 ml. of a 91% argentated resin prepared by the method of Example 1C was used to fractionate a 20-g. sample of transesterified safflower oil. The sample was eluted through the resin with methanol solvent at a flow rate of 10 ml./min. The results are reported in the Table.

EXAMPLES 11–12

The procedure of Example 10 was repeated to separate the geometric isomers of two different samples of methyl 12,15-octadecadienoate-9,10-$d_2$. The results are shown in the Table.

It is understood that the foregoing detailed description is given merely by way of illustration and that modification and variations may be made therein without departing from the spirit and scope of the invention.

TABLE

| Example | Resin mesh | % Silver | Meq. $Ag^+$/ g. resin | Methyl ester | Approximate proportion of sample (%) | Fatty acid chain length | Positions of unsaturation | Geometry of unsaturation[1] | Retention volume (ml.) | Note[2] |
|---|---|---|---|---|---|---|---|---|---|---|
| 2 | 80/100 | 100 | 3.6 | linoleate | 100 | 18 | 9,12 | c,c | ~200 | a |
| 3 | 40/80 | 72 | 2.6 | linoleate | 100 | 18 | 9,12 | c,c | 121 | |
| 4 | 80/100 | 61 | 2.2 | linoleate | 100 | 18 | 9,12 | c,c | 99 | |
| 5 | 80/100 | 54 | 1.9 | linoleate | 100 | 18 | 9,12 | c,c | 35 | |
| 6 | 16/50 | 100 | 3.6 | stearate | 20 | 18 | — | — | 14.0 | b |
| | | | | oleate | 20 | 18 | 9 | c | 34.5 | |

TABLE-continued

| Example | Resin mesh | % Silver | Meq. Ag+/ g. resin | Methyl ester | Approximate proportion of sample (%) | Fatty acid chain length | Positions of unsaturation | Geometry of unsaturation[1] | Retention volume (ml.) | Note[2] |
|---|---|---|---|---|---|---|---|---|---|---|
| 7 | 40/80 | 54 | 1.9 | linoleate | 60 | 18 | 9,12 | c,c | 34.5 | |
| | | | | stearate | 20 | 18 | — | — | 16.0 | |
| | | | | oleate | 20 | 18 | 9 | c | 16.0 | |
| 8 | 80/100 | 36 | 1.3 | linoleate | 60 | 18 | 9,12 | c,c | 30.8 | c |
| | | | | saturates | 5 | 16,18 | — | — | 13.3 | |
| | | | | oleate | 10 | 18 | 9 | c | 13.3 | |
| | | | | linoleate | 20 | 18 | 9,12 | c,c | 19.4 | |
| | | | | linolenate | 20 | 18 | 9,12,15 | c,c,c | 34.0 | |
| | | | | arachidonate | 45 | 20 | 5,8,11,14 | c,c,c,c | 310 | |
| 9 | 80/100 | 17 | 0.6 | saturates | 5 | 16,18 | — | — | 15.3 | d |
| | | | | oleate | 10 | 18 | 9 | c | 15.3 | |
| | | | | linoleate | 20 | 18 | 9,12 | c,c | 20.2 | |
| | | | | linolenate | 20 | 18 | 9,12,15 | c,c,c | 24.1 | |
| | | | | arachidonate | 45 | 20 | 5,8,11,14 | c,c,c,c | 29.6 | |
| 10 | 40/80 | 91 | 3.3 | palmitate | 10 | 16 | — | — | 700 | e |
| | | | | stearate | 2 | 18 | — | — | 700 | |
| | | | | oleate | 13 | 18 | 9 | c | 1400 | |
| | | | | linoleate | 75 | 18 | 9,12 | c,c | 4150 | |
| 11 | 40/80 | 91 | 3.3 | octadecadienoate | 66 | 18 | 12,15 | t,t | 1500 | f |
| | | | | octadecadienoate | 34 | 18 | 12,15 | c,t | 3200 | |
| 12 | 40/80 | 91 | 3.3 | octadecadienoate | 61 | 18 | 12,15 | t,c | 2500 | f |
| | | | | octadecadienoate | 31 | 18 | 12,15 | c,c | 7600 | |

[1] c = cis; t = trans.
[2] Separation of components may be considered 100% unless specifically noted. Identical retention volumes indicate no separation.
a. Methyl linoleate very slowly eluted.
b. The separation of stearate and oleate/linoleate <50% of baseline.
c. Methyl arachidonate very slowly eluted.
d. Saturates/oleate and linoleate were separated ~50% of baseline. Linoleate and linolenate were separated >95% of baseline. Linolenate and arachidonate were separated <10% of baseline.
e. Separation of saturates and oleate was >90% of baseline.
f. Separations were >95% of baseline.

We claim:

1. A method for separating compounds in a mixture which comprises a first compound and at least one second compound, wherein said first compound is a polyunsaturated monobasic fatty ester and said at least one second compound is selected from the group consisting of (1) saturated monobasic fatty esters, (2) monounsaturated monobasic fatty esters, and (3) polyunsaturated monobasic fatty esters other than said first compound, the method comprising:
   a. placing said mixture on the bed of a resin chromatography column comprising an argentated macroreticular sulfonic acid ion exchange resin having a degree of argentation within the range of 17-91% of the theoretical amount with the remainder of said resin being in the protonated form;
   b. eluting said mixture through said resin with a suitable solvent whereby said first and second compounds are eluted through said resin at differential rates; and
   c. selectively collecting each of said first and second compounds as it is eluted from said resin.

2. The method as described in claim 1 wherein said second compound is a positional isomer of said first compound.

3. The method as described in claim 1 wherein said second compound is a geometric isomer of said first compound.

4. The method as described in claim 1 wherein said mixture is a transesterified natural oil.

5. The method as described in claim 4 wherein said transesterified natural oil has been catalytically hydrogenated.

6. The method as described in claim 1 wherein said polyunsaturated first compound is a dienoic ester and the degree of argentation is in the range of 41-91%.

7. The method as described in claim 1 wherein said polyunsaturated first compound is a trienoic or tetraenoic fatty ester and the degree of argentation is in the range of 17-40%.

* * * * *